Oct. 9, 1928.
F. W. CUTLER
1,686,519
CONVEYER
Filed Oct. 19, 1926
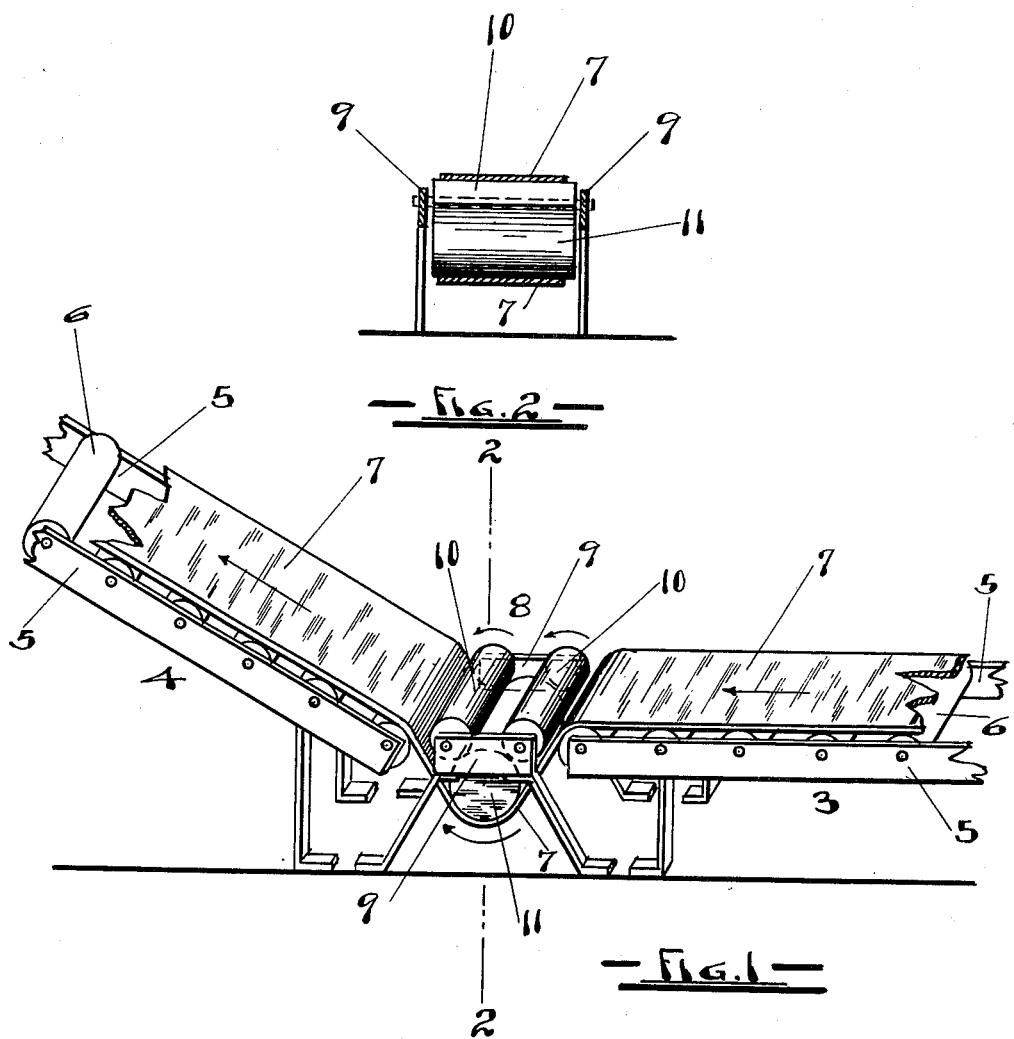
INVENTOR
FRANK W CUTLER.
BY C.F. Blake
ATTY.

Patented Oct. 9, 1928.

1,686,519

UNITED STATES PATENT OFFICE.

FRANK W. CUTLER, OF PORTLAND, OREGON.

CONVEYER.

Application filed October 19, 1926. Serial No. 142,736.

My invention relates to conveyers in general, and particularly to belt conveyers wherein the belt travels over a series of supporting rollers, the object being to provide simple and convenient means for changing the angular relationship of one part of the conveyer to another adjacent part thereof.

I accomplish this object by means of the construction illustrated in the accompanying drawing, which is a part of this application for Letters Patent, like characters of reference indicating like parts throughout the several views thereof, and in which;—

Fig. 1 is a perspective view of portions of two parts of a belt conveyer positioned at an angle one with the other, and embodying my invention.

Fig. 2 is a section upon line 2—2 of Fig. 1.

In the drawing is shown parts of two conveyers 3 and 4 each consisting of side rails 5 with a series of rollers 6 rotatably mounted therebetween. The conveyer 4 is positioned at an angle relatively to conveyer 3 as shown in Fig. 1. Such conveyers are commonly made in sections adapted to be placed end to end as desired to make a complete conveyer of whatever length necessary, and a belt 7 is common to all such sections. Said belt is driven by any suitable mechanism, many types of which are well known to the art, and as they are no part of this invention they are not shown on the drawing. The belt 7 travels in the same direction upon each conveyer section as shown by the arrows thereon in the drawing.

In practice the belt 7 must be kept stretched tight, and to accomplish this at the point of deviation of the inclined conveyer with the horizontal conveyer, and also to provide conveying means from one conveyer section to the other traveling in the same direction as the belt 7, and driven by said belt, is the function of this invention.

When it is desired to change the angularity of one conveyer section, such as 4, relatively to another conveyer section, such as 3, the two sections are separated, and a short section 8 placed intermediate thereof. Said section 8 is provided with side rails 9 and a pair of rollers 10 rotatably mounted therebetween. A floating roller 11 is positioned beneath said rollers 10 and in contact with each thereof. Said roller 11 is of just sufficient length to rotate freely between the side rails 9, which side rails confine the roller 11 longitudinally. The belt 7 is led beneath the roller 11, said belt holding the roller 11 against the rollers 10. Thus the roller 11 is a floating roller having no bearings upon which to rotate, and is also an idler between the belt 7 and the rollers 10 to rotate the latter rollers in the same direction as the belt travels, as shown by the arrows in Fig. 1. Thus the material is carried by power from the belt upon conveyer 3 to the portion of the same belt upon conveyer 4 by the power driven rollers 10.

My invention may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new and desire to secure by Letters Patent is:

1. In a traveling belt conveyer: a pair of adjacent rollers; a floating roller beneath said adjacent rollers held in contact with each thereof by the traveling belt.

2. In a traveling belt conveyer: a pair of adjacent rollers driven by the belt in the same direction thereof by means of a floating roller intermediate said belt and said driven rollers.

3. Adjacent sections of a traveling belt conveyer; a section intermediate said former sections; rollers mounted in said intermediate section; a floating roller beneath said rollers; and a traveling belt passing from one of said adjacent sections to the other beneath said floating roller, and holding said floating roller in contact with said former rollers.

4. In a traveling belt conveyer: a floating roller causing a depression in said belt, and a pair of conveying rollers driven from said floating roller.

In witness whereof I claim the foregoing as my own I hereunto affix my signature at Portland, county of Multnomah, State of Oregon, this 2nd day of Dec., 1925.

FRANK W. CUTLER.